Oct. 4, 1960 — D. A. HAMILTON — 2,954,768
PUNCTURE POINT
Filed June 14, 1954 — 2 Sheets-Sheet 1

INVENTOR,
DONALD A. HAMILTON
BY Lyon & Lyon
ATTORNEYS

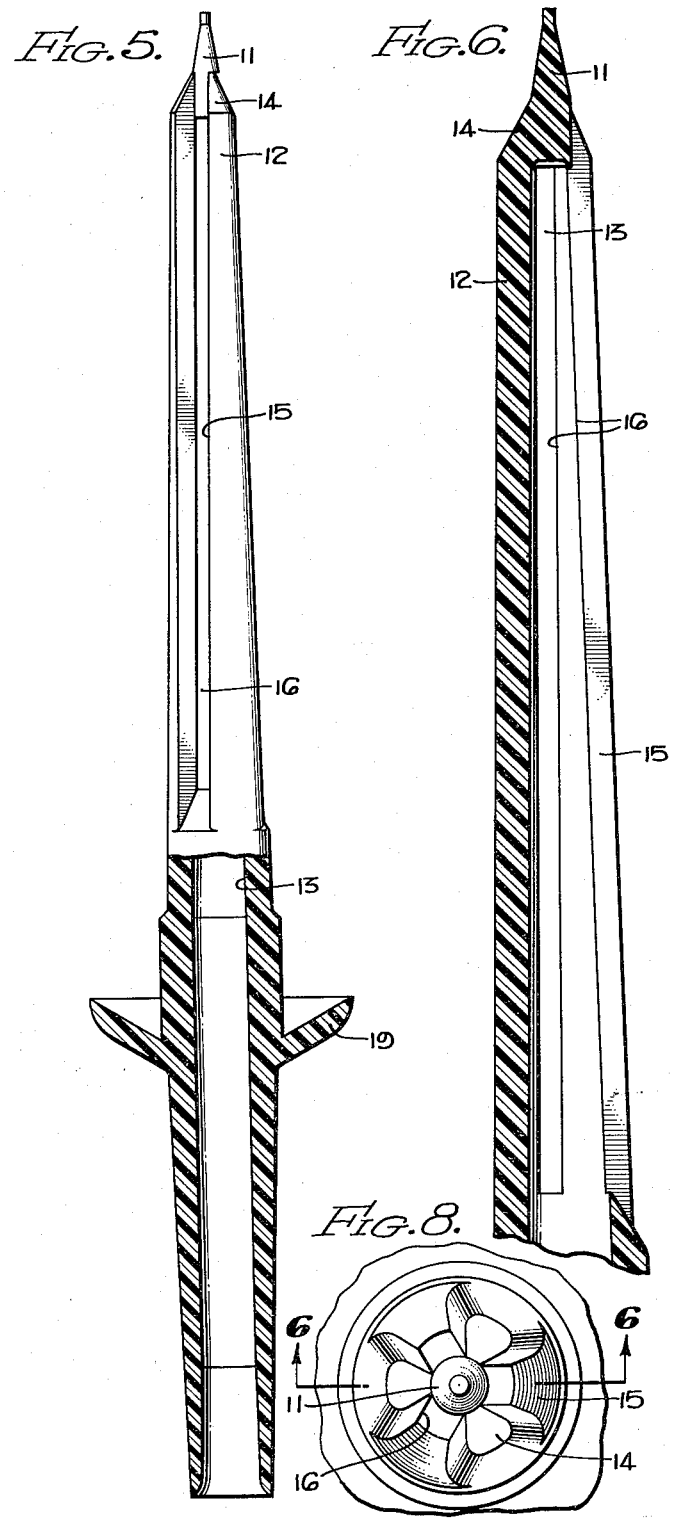

United States Patent Office 2,954,768
Patented Oct. 4, 1960

2,954,768

PUNCTURE POINT

Donald A. Hamilton, Burbank, Calif., assignor to Don Baxter, Inc., Glendale, Calif., a corporation of Nevada Filed June 14, 1954, Ser. No. 436,285

6 Claims. (Cl. 128—221)

This invention relates to a puncture point for puncturing skin, rubber, plastic or other materials. It is particularly useful for connecting administration sets to containers of blood or solutions for parenteral and tubal use. It is also useful as a point of a hypodermic needle.

Administration sets are often connected to collapsible plastic containers by forcing a pointed adapter through a rubber or plastic patch on the container wall; see, for example, Patents Nos. 2,597,715 and 2,653,606.

The puncture points now employed on connectors are either difficult to insert or have sharp edges which cut off or abrade pieces of rubber or plastic in the puncturing operation. Such pieces of rubber or plastic are undesirable in a solution for parenteral or tubal use and also may plug the administration set.

It is a general object of the present invention to provide a puncture point which is easily inserted but which will not core, cut off or abrade the material it punctures.

Another object of the present invention is to provide a puncture point which can be cheaply manufactured out of plastic material.

A further object of the present invention is to provide a puncture point on a connector by means of which administration sets can be attached to any of the containers now in use, i.e., those of the collapsible plastic type, bottles with solid rubber stoppers or bottles with open hole rubber stoppers.

The puncture point of the present invention consists of a hollow shaft tapering to a point. Longitudinal channels are provided in a portion of the tapered section and may extend along a portion of the shaft. Openings or slots, communicating with the inside of the hollow shaft, are located at the bottom of these channels and are protected by the exterior walls of the shaft and tapered sections.

The puncture point and connectors including such puncture points of the present invention will be more fully understood from the following description of the preferred examples of the invention. Such preferred examples are shown in the accompanying drawings in which:

Figure 5 is an enlarged side elevation, partially in section, of a modified form of the invention.

Figure 6 is a section on the line 6—6 of Figure 8.

Figure 7 is a perspective view of a second form of the invention.

Figure 8 is a top plan view of the puncture point.

Figure 1:
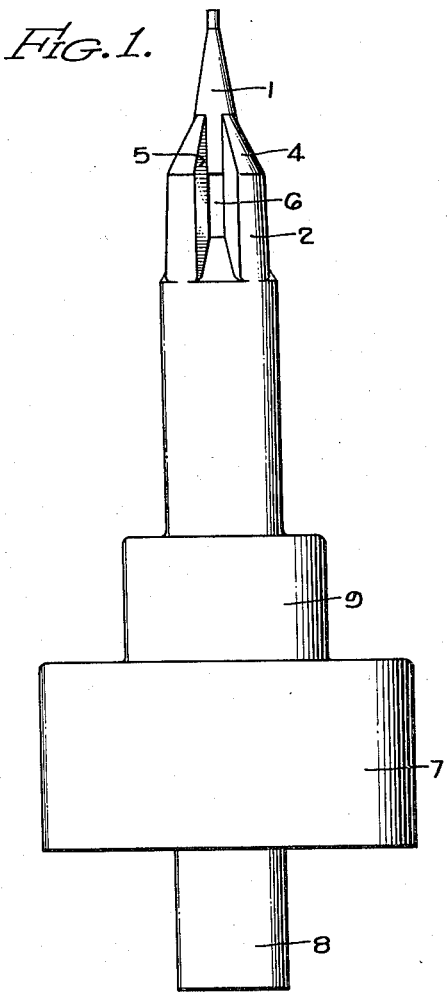
Figure 1 is an enlarged side elevation of one form of the invention.
Figure 2:
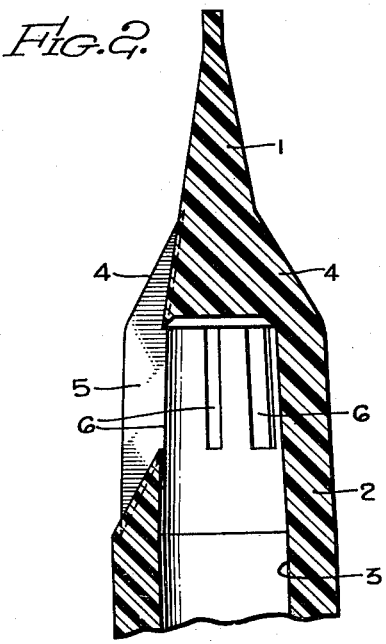
Figure 2 is a cross section on the line 2—2 of Figure 4.
Figure 3:
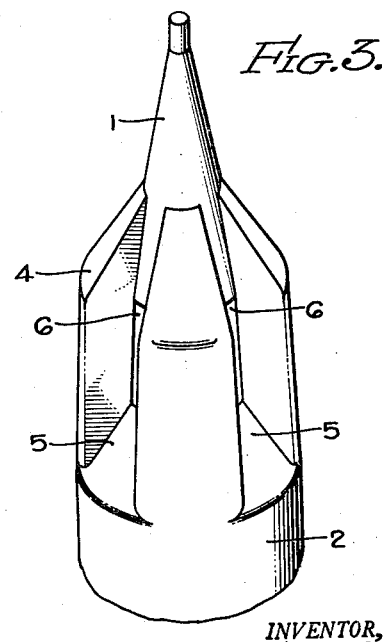
Figure 3 is a fragmentary perspective view.
Figure 4:
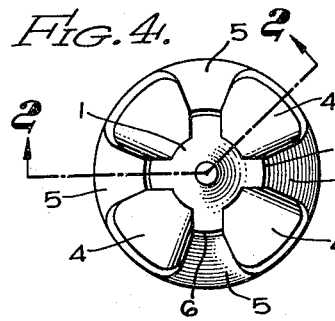
Figure 4 is a top plan view of the puncture point.

Referring to the view of the Figures 1–4 of the drawings, in the first form of the device there may be seen to be a centered pointed section 1 which is integrally connected to a shaft portion 2, which is provided with a bore 3 leading down to near the pointed section 1. The pointed section 1 and the shaft portion 2 are integrally connected by means of the tapered section 4.

From the inner end of the pointed section 1 there is a plurality of channels 5 (four in this example of the invention) extending longitudinally through the tapered shoulder 4. In each of the said channels 5 there are provided elongated slots 6 through to the bore 3 of the shaft section.

The walls of the shaft portion 2 are rounded and prevent the sharp edges at the base of slots 6 from cutting or abrading the pierced material. Furthermore, the channels 5 provide a means for a smooth streamlined flow of fluid to the slots 6 and hence to the interior of the bore 3 of the device even when the slots are blocked, as by collapse of a vein when the point is used as a hypodermic needle. These slots 6 may be of a width sufficiently small to serve as a means for straining liquids, but by elongation thereof the area of liquid entrance through the slots can be readily made equal to or greater than the area of the bore 3.

Preferably the device also includes as an integral element a cap 7 for receiving the end of a tube, and also may be provided with an integral hub 9 and an integral drip indicator 8.

Now referring to Figures 5, 6, 7 and 8 of the drawings, a second form of the invention is shown. This form of the invention is particularly designed to emphasize the straining characteristics of the puncture point and in this form of the invention the device also comprises a sharply pointed section 11 which is joined by a tapered portion 14 with the shaft section 12 and a bore 13 extending to near the pointed section 11.

The channels 15 commence in the tapered section 14 and extend in this form for a considerable distance along the shaft section 12. In each of such channels 15 there are provided very long and very narrow slots 16. In this form of the invention, as indicated, there are only three channels 15 and three slots 16 spaced equally circumferentially, but any desired number may be employed. Again, the rounded walls of the shaft section 12 prevent the pierced material from contacting the sharp edges at the base of the slots 16 and eliminate danger of the puncture point cutting or abrading in use.

The shaft is also provided with the finger grip 19.

The devices of the present invention are readily produced from plastic material, are easy to insert and will not cut, core or abrade material in the insertion operations. The device may be economically manufactured by injection molding. I have found that thermoplastic material such as polyvinyl chloride, is excellent for making the puncture point of the present invention or connecting elements containing such puncture points. Other thermoplastic materials, such as styrene, cellulose acetate, nylon, etc., also can be employed satisfactorily. The puncture points may also be made of metal by centrifugal casting, investment casting or other methods.

When the puncture point of the present invention is used to connect a donor set to a vacuum bottle to draw blood the four slots mix the blood more effectively with the anticoagulant. Thus hand-mixing, by rotating the bottle, may prove unnecessary. When the puncture point of the present invention is used to connect an administration set to a plastic container no entry pad is required. The point may be inserted directly through the side of the container in which case it pierces, then stretches the container wall. The stretched plastic holds the point in place without leakage. The sharp point is strong and well supported so that it does not bend, break or dull on insertion.

While the particular forms of the invention herein described are well adapted for carrying out the objects

I claim:

1. A puncture point comprising: a tubular shaft; an inner surface on said shaft defining a longitudinal passage; a conical point; a frusto-conical shoulder between said shaft and said point; walls defining channels extending longitudinally through said shoulder and along a portion of the shaft, said walls slanting inwardly toward the bottom of each channel and meeting the inner surface of the shaft, thereby defining a slot in each channel opening into the longitudinal passage; rounded exterior surfaces on said shaft and shoulder; and a slanted surface extending rearwardly from each slot to the outer surface of the shaft.

2. A puncture point comprising: a tubular shaft defining a longitudinal passage therethrough; a conical point; a frusto-conical shoulder section between the shaft and the point, said shoulder section tapering rapidly outward from the base of the conical point to the diameter of the shaft; walls defining channels extending longitudinally through said shoulder section and along a portion of the shaft, said walls slanting inwardly towards the bottom of each channel and passing through the shaft, thus defining a slot in each channel opening into the longitudinal passage; rounded exterior surfaces on the channel walls where they meet the outer surface of the shaft and shoulder sections; and a wall slanting rearwardly from the end of each slot to the outer surface of the shaft.

3. A puncture point comprising: a tubular shaft having a longitudinal bore; a point on one end of the shaft; walls defining at least one channel extending longitudinally along a portion of the point and of the shaft, said walls passing completely through a portion of the shaft so as to define at least one opening communicating with the bore, said walls tapering inwardly toward said opening; and rounded outer surfaces on said channel walls.

4. A puncture point comprising: a shaft; an inner surface on said shaft defining a bore; a conical point; shoulders arising sharply from said point to the full diameter of one end of the shaft and integrally joining the point to the shaft; the outer surfaces of said shaft, point, and shoulders having substantially circular cross-sections; walls defining a channel extending longitudinally from the base of the conical point through the shoulders and along a portion of the shaft, said walls meeting the inner surface of the shaft so as to define a slot at the base of the channel opening into the bore of the shaft, said walls tapering inwardly toward said slot; the shoulders being adapted to spread material pierced by the point and to hold said material away from the slot; rounded outer surfaces where the walls meet the outer surface of the shaft; and an outwardly tapering surface from one end of said slot to the outer shaft surface.

5. A hypodermic needle comprising: a shaft having a bore; a conical point; a frusto-conical shoulder section between said shaft and said point tapering rapidly outward from the base of the point to the diameter of one end of the shaft; walls defining a channel extending longitudinally through said shoulder section and a portion of the shaft, said walls slanting inwardly towards the bottom of the channel and extending through the shaft to form an opening communicating with the bore; rounded exterior surfaces on said walls where they join the outer surface of the shaft and shoulder sections; portions of the channel walls extending along the shaft rearwardly of the opening; and an outwardly slanted surface between said portions of the walls.

6. A puncture point comprising: a shaft; an inner surface defining a bore through said shaft; a cone-shaped point on one end of said shaft; a round base on said point substantially the same diameter as the shaft bore and defining the end thereof; a frusto-conical shoulder section flaring outwardly from said cone-shaped point between the tip and the base thereof, extending beyond said base, and joining with the shaft; and walls defining a channel extending longitudinally through said shoulder section and along a portion of the shaft, said walls meeting the inner surface of the shaft to define an opening communicating with the end of the shaft bore adjacent the base of the point.

References Cited in the file of this patent

UNITED STATES PATENTS

| Number | Name | Date |
|---|---|---|
| 648,858 | Dogle | May 1, 1900 |
| 1,147,408 | Kells | July 20, 1915 |
| 1,333,745 | Wescott | Mar. 16, 1920 |
| 2,073,069 | Lee | Mar. 9, 1937 |
| 2,634,726 | Hanson | Apr. 14, 1953 |
| 2,681,654 | Ryan et al. | June 22, 1954 |
| 2,746,455 | Abel | May 22, 1956 |